United States Patent [19]

Yamada et al.

[11] Patent Number: 5,225,153
[45] Date of Patent: Jul. 6, 1993

[54] PEBBLE-TYPE HIGH TEMPERATURE GAS REACTOR

[75] Inventors: Masao Yamada, Kanagawa; Hitoshi Hayakawa, Tokyo, both of Japan

[73] Assignee: Fuji Electric Co., Ltd., Japan

[21] Appl. No.: 675,980

[22] Filed: Mar. 26, 1991

[30] Foreign Application Priority Data

Mar. 26, 1990 [JP] Japan .................................. 2-76201

[51] Int. Cl.$^5$ .............................................. G21C 11/00
[52] U.S. Cl. ...................................... 376/381; 376/382; 376/385
[58] Field of Search ................... 376/381, 392, 370

[56] References Cited

U.S. PATENT DOCUMENTS

| | | | |
|---|---|---|---|
| 3,228,852 | 11/1966 | Holmes | 376/381 |
| 3,287,910 | 11/1966 | Silverstein | 376/381 |
| 3,321,376 | 5/1967 | Machnig et al. | 376/381 |
| 3,867,253 | 2/1975 | Gratton et al. | 376/352 |
| 4,816,212 | 3/1989 | Bodmann et al. | 376/381 |
| 5,017,333 | 5/1991 | Hayashi et al. | 376/382 |

Primary Examiner—Donald P. Walsh
Assistant Examiner—Frederick H. Voss
Attorney, Agent, or Firm—Brumbaugh, Graves, Donohue & Raymond

[57] ABSTRACT

A multiplicity of pebble-bed cores are housed within separate concrete cavities of a multi-cavity prestressed concrete pressure vessel. Primary cooling systems, one for each pebble-bed core, are supported within another cavity which is coaxial with the longitudinal axis of the prestressed concrete pressure vessel. Tunnel ducts formed within the walls of the concrete vessel communicate between the cavities which house the pebble-bed cores and the cavity which houses the primary cooling systems. Pipes connecting the cores to the primary cooling systems pass through these ducts.

11 Claims, 2 Drawing Sheets

PEBBLE-TYPE HIGH TEMPERATURE GAS REACTOR

BACKGROUND OF THE INVENTION

The present invention relates to pebble-bed type high temperature gas reactors, and more particularly to gas reactors having a multi-cavity prestressed concrete reactor vessel (PCRV).

Pebble-bed core nuclear reactors utilize a core comprising a column of spherical fuel elements, each of which is approximately 6 cm in diameter. One advantage of pebble-bed core reactors is that they allow fuel to be exchanged during the operation of the reactor. Another is that the spherical fuel has a high rate of burn.

There are two types of pebble-bed core reactor designs: monolithic designs consisting of a single large core, and module designs which utilize a number of smaller cores.

Monolithic pebble-bed reactors have a large core disposed at the center of a prestressed concrete pressure vessel. Primary cooling systems such as gas circulators and steam generators are located around the core. The monolithic design has the advantage that a single unit can produce high output. Currently, a 300 megawatt reactor of monolithic design is in operation in Germany and a 500 megawatt plant is being developed. There are, however, disadvantages to this design. For instance, due to the size of the core, low temperature shut-down can not be achieved by merely inserting control elements into the reflector regions which surround the core. Instead control elements must be inserted directly into the core. This can result in damage to the spherical fuel elements. Another disadvantage of the large cores associated with reactors of the monolithic design is that they require large reflectors above the core. Large reflectors are difficult to support and are prone to damage from earthquakes.

Module type pebble-bed reactors consist of a number of smaller cores and primary cooling systems. Each core and its associated primary cooling system is housed in a separate individual steel pressure vessel which is connected by a large bore pipe to its associated primary cooling pressure vessel to form a single unit.

The diameter of the core of modular type reactors typically is no greater than 3 meters, and they have a power density of 3 watts per cubic centimeter or less. Low temperature shut-down of a module type core can be achieved by merely inserting control elements into the reflectors which surround the core, making it unnecessary to insert control elements directly into the core and risk damage to the fuel pellets. Furthermore, due to their small size, the cores of module type reactors do not need to support large reflectors over the core, making the core less prone to earthquake damage.

The output of a single module type pebble-bed reactor being about 80 MW, a number of them must be used in order to produce an output equal to that of a monolithic style reactor. Facilities comprised of enough modular type reactor units to produce an output equivalent to that of a monolithic reactor generally require much larger sites than the facilities associated with the monolithic reactors. Thus, module type reactors are far less efficient in terms of site utilization. Another disadvantage of the modular type of design is that the pipe which connects each core pressure vessel to its primary cooling system is subject to damage from earthquakes and similar disasters.

In an earlier design proposed by one of the present applicants and another, described in copending U.S. patent application Ser. No. 07/475,693, filed Feb. 6, 1990, the reactor core region is surrounded by a unitary reflector which is sectioned into a plurality of core sub-regions (typically three) by means of partition walls formed of reflector material, and the unitary reflector is housed within a single-cavity prestressed concrete pressure vessel. The primary cooling systems, one for each core sub-region, are disposed in the annular space between the reflector and the inner wall of the pressure vessel. A disadvantage of this design is that because of the proximity of the core sub-regions and the fact that the cores are separated from each other only by reflector material, typically graphite, conditions in one of the reactors can influence the condition of its neighbors. That is to say, an accident in one core can cause damage to one or more other cores.

It is an object of this invention to provide a pebble-bed type high temperature gas reactor which can produce up to several hundred megawatts of output without suffering the described disadvantages of previous designs.

SUMMARY OF THE INVENTION

To obviate the above mentioned problems, in the pebble-bed high temperature gas reactor according to the present invention, a multiplicity of pebble-bed cores are housed within separate concrete cavities of a multi-cavity prestressed concrete pressure vessel. Primary cooling systems, one for each pebble-bed core, are supported within another cavity which is coaxial with the longitudinal axis of the prestressed concrete pressure vessel. Tunnel ducts formed within the walls of the concrete vessel communicate between the cavities which house the pebble-bed cores and the cavity which houses the primary cooling systems. Pipes connecting the cores to the primary cooling systems pass through these ducts.

DESCRIPTION OF PREFERRED EMBODIMENTS

Figure 1:
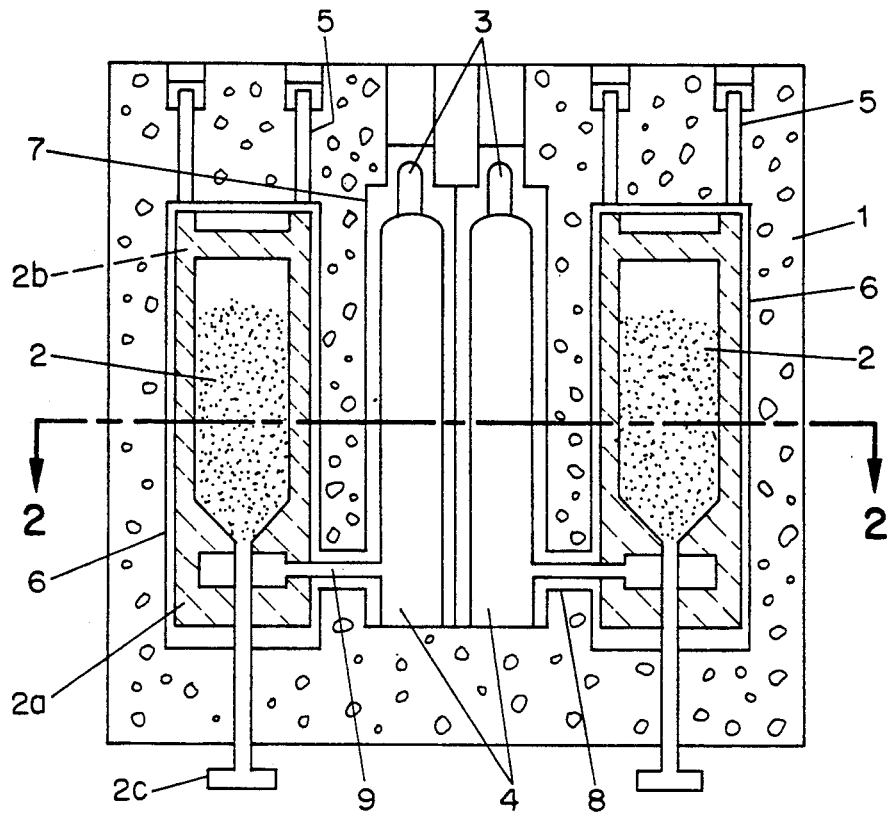
FIG. 1 is a vertical sectional view illustrating the construction of one embodiment of the present invention.
Figure 2:
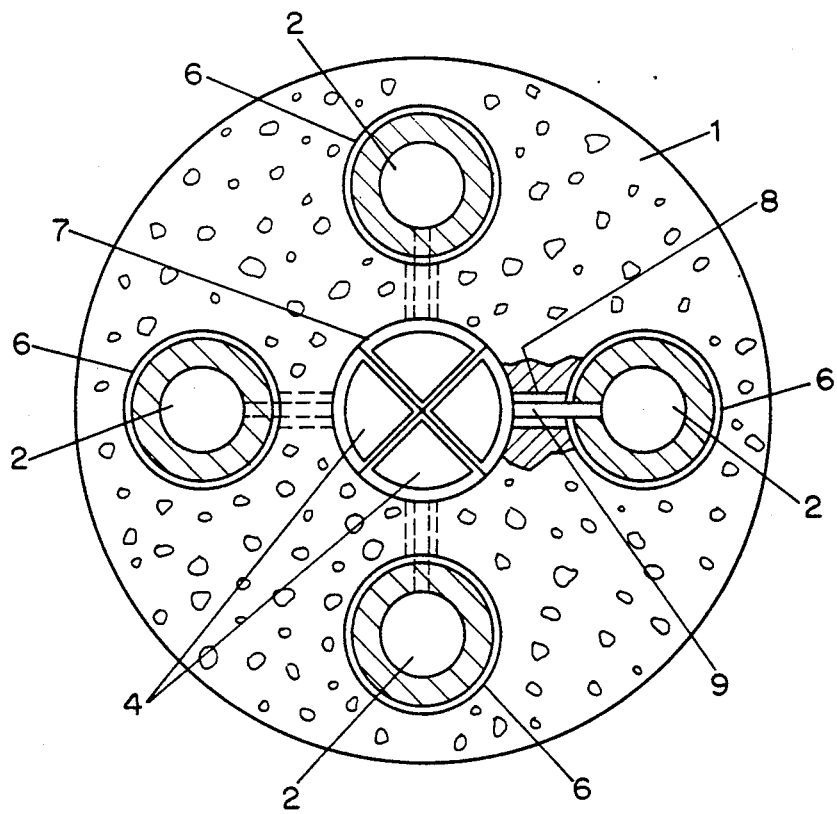
FIG. 2 is a cross-sectional view taken along the line 2—2 of FIG. 1.

Referring to FIGS. 1 and 2, the pebble-bed high temperature gas reactor constructed in accordance with the present invention includes a cylindrical pressure vessel 1 made of prestressed concrete having a vertically-oriented longitudinal axis and top and bottom portions, and having a multiplicity of elongated cylindrical cavities 6 formed therein each for containing a column of fuel elements forming a like multiplicity of pebble-bed cores 2. As seen in FIG. 2, the cavities 6, four in number, are uniformly distributed along an imaginary circle coaxial with and spaced radially outward from the axis of the vessel and, as seen in FIG. 1, are disposed intermediate the top and bottom portions of the vessel. Each primary cooling system unit, which includes a circulator 3 and a steam generator 4 for each pebble-bed core, is contained in a like multiplicity of vertically-oriented chambers formed by partitioning a central circular cavity 7 which longitudinally extends from the bottom to the to top of the vessel. Each of the pebble-bed cores 2 is surrounded by a cylindrical side reflector 2a and top reflector 2b. Control rod drive assemblies 5, one for each pebble-bed core, are supported on and controllable from the top of the vessel for inserting control elements into the reflector walls. Each pebble-bed core is provided with a fuel discharge apparatus 2c, extending downwardly from the bottom of the core. Each of the pebble-bed core cavities 6 communicates with a respective chamber of the central cavity 7 via a horizontally extending tunnel duct 8 formed in the concrete pressure vessel near the bottom thereof at a level opposite the lower end of the pebble-bed core.

Figure 3:
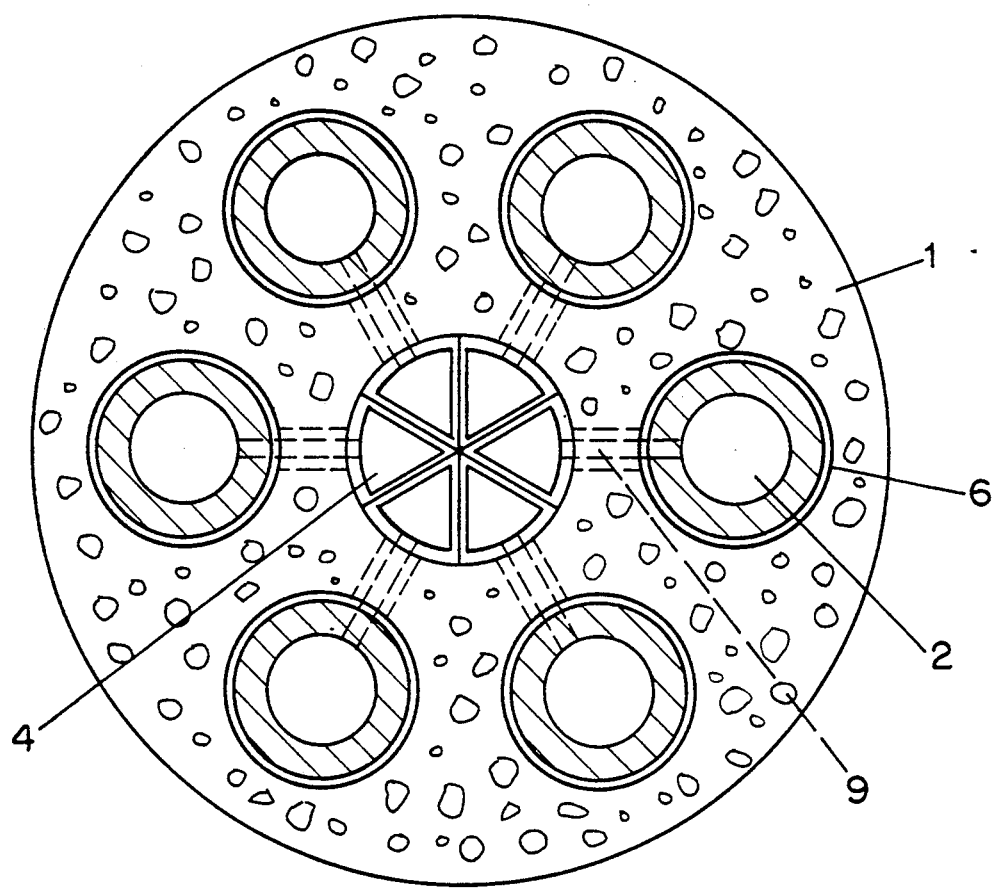
FIG. 3 is a cross-sectional view showing another arrangement of reactor cores.

FIGS. 2 and 3 show embodiments of the present invention with four and six cores respectively. As can be seen from these views, double pipes 9, which connect the cores to the primary cooling systems pass through tunnel ducts 8.

Each cavity 6 is formed of prestressed concrete and is located around the periphery of the prestressed concrete pressure vessel. Within each cavity is a pebble-bed core surrounded by reflectors. Control elements are insertable into the reflectors to control reaction rates.

Each core has a diameter of 3 meters or less and a power density of about 3 watts per cubic centimeter. Thus low-temperature shut-down of the core can be achieved by inserting the control elements into the reflectors.

The pebble-bed high temperature gas reactor constructed in the manner described above according to the present invention has the following advantages:

a) By housing pebble-bed cores and primary cooling systems in individual cavities of a single prestressed concrete pressure vessel, a pebble-bed type high temperature gas reactor which is similar to a single unit monolithic type reactor in appearance and output, and which has the operational advantages of a multi-module type reactor is obtained.

b) Low temperature shut-down of the reactor can be achieved by inserting control elements in the reflector regions of each core. Thus it is not necessary to insert control elements directly into a core. This avoids damage to the spherical fuel elements.

c) Because each core unit is surrounded by concrete, they are isolated from each other. Thus an accident in one reactor unit will not damage or cause an accident to occur in any of the other units.

d) A pipe having a large bore diameter which connects the pressure vessel of the core and the pressure vessel of the primary cooling system equipment in traditional module type reactors is not required by the present invention. Thus a reactor of the present design has the advantages of module type reactors while maintaining the size advantages, rigidity and the ability to withstand damage from earthquakes of monolithic type reactors.

We claim:

1. Module-type high temperature gas nuclear reactor apparatus comprising, in combination:

an elongate right circular cylindrical body formed of concrete having a central vertically-oriented longitudinal axis, said body having formed therein an elongate central cavity coaxial with said longitudinal axis and having upper and lower ends closed by top and bottom portions, respectively, of said concrete body, and a multiplicity of elongate equal-diameter right circular cylindrical reactor cavities radially displaced from, distributed around and separated from said central cavity and from each other by a wall of concrete each for containing a column of fuel elements forming the core of a respective reactor, said reactor cavities being substantially coextensive with said central cavity and having upper and lower ends closed by said top and bottom portions, respectively, of said body;

a liner of reflector material within each of said reactor cavities for surrounding a column of fuel elements contained therein;

primary cooling means supported within said central cavity between said top and bottom portions of said body;

a multiplicity of tunnel ducts, one for each reactor cavity, each extending radially and horizontally from a location near the lower end of said central cavity to a respective reactor cavity through a wall of concrete separating the reactor cavity from the central cavity; and means for defining a path for the flow of hot gas from each reactor to said primary cooling means including a like multiplicity of pipes, one extending from each of said reactor cavities through a respective tunnel duct to said primary cooling means;

whereby said concrete body defines a pressure vessel in which said multiple reactors, said primary cooling means and said means for defining a gas flow path from each reactor to the primary cooling means are contained and wherein each reactor is surrounded by concrete and isolated from the others so that an accident in one reactor will not cause damage or accident in any other reactor.

2. Module-type high temperature gas reactor apparatus according to claim 1, wherein each reactor includes control elements insertable into the upper end of its associated reflector and operable independently of the control of the others.

3. Module-type high temperature gas reactor apparatus according to claim 1, wherein said concrete cylinder has four circular cylindrical reactor cavities formed therein uniformly spaced along an imaginary circle centered on said longitudinal axis.

4. Module-type high temperature apparatus according to claim 1, wherein said concrete cylinder has six circular cylindrical reactor cavities formed therein uniformly spaced along an imaginary circle centered on said longitudinal axis.

5. Module-type high temperature gas reactor apparatus according to claim 1, wherein said primary cooling means comprises a like plurality of separate cooling units each associated with a respective reactor.

6. Module-type high temperature gas reactor apparatus according to claim 5 wherein said central cavity is partitioned into a like multiplicity of vertically oriented chambers longitudinally extending from the bottom to the top of said central cavity, each of which faces a respective reactor cavity and each of which contains a separate unit of the primary cooling means.

7. Module-type high temperature gas nuclear reactor apparatus comprising, in combination:

a cylindrical concrete pressure vessel having a longitudinal axis and top and bottom portions having formed therein an elongated central cavity coaxial with said longitudinal axis and a multiplicity of elongated reactor cavities radially displaced from said central cavity, wherein said reactor cavities are circular cylindrical and of equal diameter and each contains a column of fuel elements which form the core of a respective reactor, said columns of fuel elements having a diameter no greater than three meters and a power density no greater than three watts per cubic centimeter whereby low temperature shut-down of each module-type core can be achieved by merely inserting control elements into a reflector which surrounds the core, and a like multiplicity of tunnel ducts disposed in said bottom portion each extending horizontally and radially from said central cavity to a respective reactor cavity, primary cooling means supported within said central cavity, and means for defining a gas flow path from each reactor to said primary cooling means which extends through a tunnel duct associated with a respective reactor cavity.

8. Module-type high temperature gas reactor apparatus according to claim 7, wherein said concrete cylinder has four circular cylindrical reactor cavities formed therein uniformly spaced along an imaginary circle centered on said longitudinal axis.

9. Module-type high temperature gas reactor apparatus according to claim 7, wherein said concrete cylinder has six circular cylindrical reactor cavities formed therein uniformly spaced along an imaginary circle centered on said longitudinal axis.

10. Module-type high temperature gas reactor apparatus according to claim 7, wherein said primary cooling means comprises a like plurality of separate cooling units each associated with a respective reactor.

11. Module-type high temperature gas reactor apparatus according to claim 10 wherein said central cavity is partitioned into a like multiplicity of vertically oriented chambers longitudinally extending from the bottom to the top of said central cavity, each of which faces a respective reactor cavity and each of which contains a separate unit of the primary cooling means.

* * * * *